W. S. OSBORNE.
ART OF MAKING ICE.
APPLICATION FILED SEPT. 27, 1911.
1,104,920.
Patented July 28, 1914.
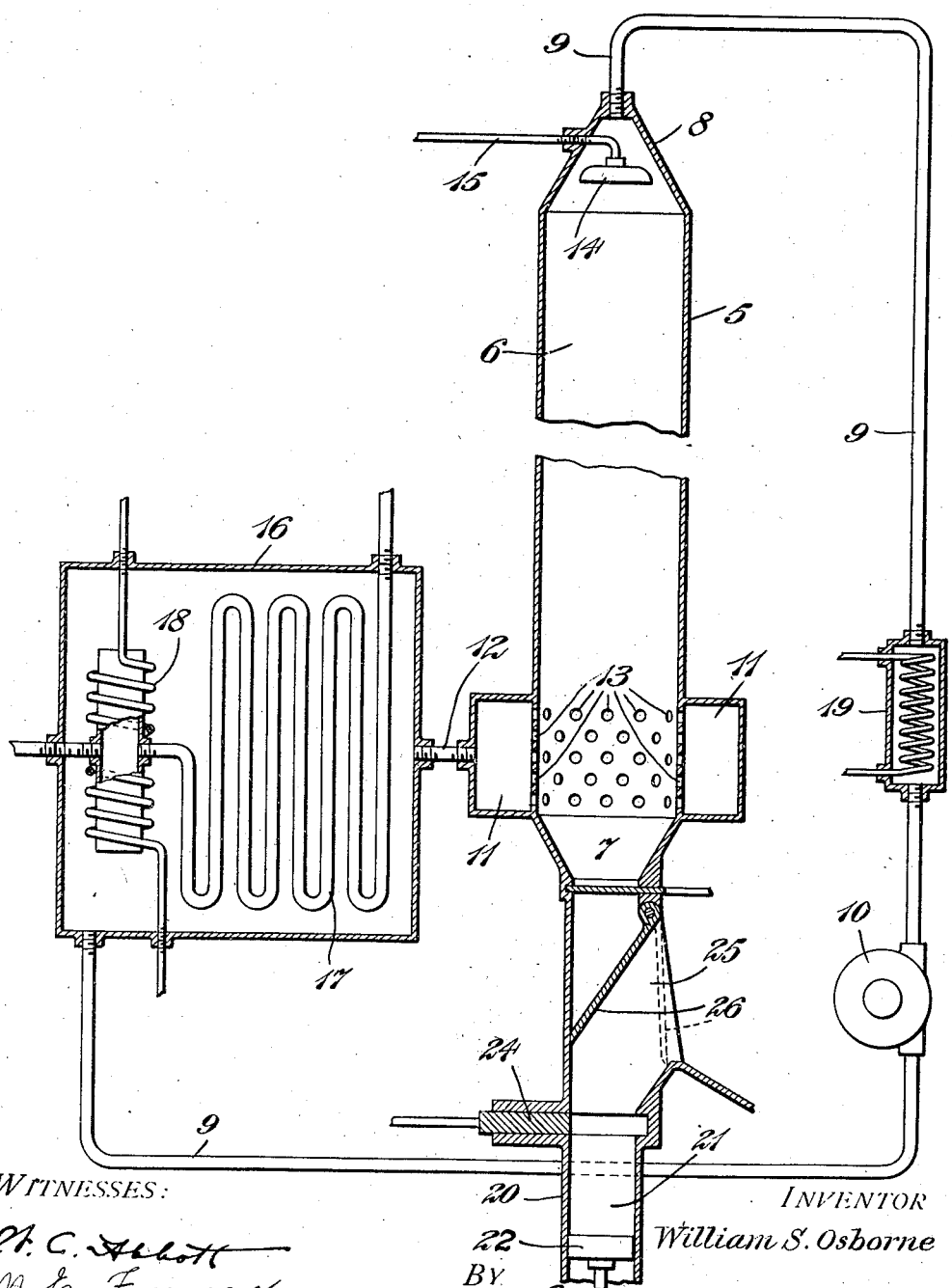
WITNESSES:
P. C. Abbott
M. E. Freeman
INVENTOR
William S. Osborne
BY
Griffins Bradford
Attorneys

UNITED STATES PATENT OFFICE.

WILLIAM S. OSBORNE, OF NEW YORK, N. Y., ASSIGNOR TO THE OSBORNE PATENTED MACHINERY CO., INC., A CORPORATION OF NEW YORK.

ART OF MAKING ICE.

1,104,920.          Specification of Letters Patent.          Patented July 28, 1914.

Application filed September 27, 1911. Serial No. 651,624.

*To all whom it may concern:*

Be it known that I, WILLIAM S. OSBORNE, a citizen of the United States, residing in the city of New York, borough of Manhattan, county and State of New York, have invented a certain new and useful Art of Making Ice, of which the following is a specification.

This invention is a process of making ice involving a certain novel mode of procedure by which cakes of ice may be produced economically and in less time than is required in the manufacture of ice by the so called "plate" and "can" systems.

According to this invention, water is sprayed into an atmosphere the temperature of which is at or below the freezing point, thus resulting in a rapid congelation of the small drops of water, converting the same into ice, and then a certain volume of the resulting frozen particles are subjected to pressure for the purpose of compressing the same into a cake.

At present, my preferred mode of procedure involves the following steps; first, the air is blown into contact with appropriate cooling coils and exhausted from a congealing chamber by the operation of an exhaust fan, so that the air is utilized repeatedly in the operation of freezing the drops of water; second, the frozen particles which are precipitated through the atmosphere in the congealing chamber are collected in a compartment at the base of said congealing chamber; third, a desired quantity of the frozen particles is drawn off and supplied into a mold or compression chamber; fourth, the measured quantity of frozen particles are subjected to compression between a follower and the piston of a hydraulic press so as to compress the frozen particles, with or without the addition of a small quantity of water, into a compact relatively solid cake or charge of ice; and, finally, this cake is expelled from the mold or pressure chamber. The operations of compressing the frozen particles into cakes is carried on at intervals, or intermittently, but the steps of freezing the drops of liquid which is sprayed in a shower within the cooling chamber is carried on continuously, thus resulting in a novel mode of procedure which can be carried on rapidly and economically.

The drawing herewith annexed illustrates diagrammatically one form of apparatus suitable for carrying out my process.

The apparatus shown embodies a tower 5 of suitable height and diameter. Said tower provides a vertical elongated congealing chamber 6, the lower part of said tower being contracted in diameter so as to produce a tapering chamber 7 at the bottom of the congealing chamber. The top of the tower is closed at 8, and to this closed upper end of the tower is connected a suction pipe 9, the latter extending downwardly toward the base of the tower. This suction pipe communicates with the intake to air exhauster 10, the outlet from which exhauster is connected with the lower part of the congealing chamber.

At or near the base of the tower is a distributing chamber 11, to which chamber is connected a pipe 12 whereby the air from the exhauster is forced into the distributing chamber. The distributing chamber communicates with the lower part of the congealing chamber by openings 13, a number of said openings being provided in the wall of the tower, for the purpose of feeding air uniformly into the lower part of the congealing chamber. The air is circulated by the fan through the tower for the purpose of establishing an upward flow of cold air through the congealing chamber, the air being supplied at a certain predetermined pressure.

Positioned within the tower at the upper part thereof is a sprayer 14 of any suitable form, and to this sprayer is connected a liquid supply pipe 15, the latter acting to supply water or other liquid in the required volume to the sprayer. Said sprayer discharges the water in a shower within the upper part of the cooling chamber, the drops of water falling through the cooling chamber and meeting the upwardly flowing current of cold air, whereby the drops of water are congealed as they fall through the tower, thus resulting in artificially frozen hail or ice particles.

Suitable means are provided for cooling the air to the required low temperature before it flows into the congealing chamber of the tower. Various forms of refrigerating mechanisms may be employed for this purpose, but a simple structure which is economical in operation is shown in the drawings. To the pipe 12 between the air exhauster and the distributing chamber is connected a tank 16 within which is positioned a coil 17, through which coil is adapted to circulate a solution, preferably containing calcium chlorid. One part of the coil is enveloped by another coil 18 through which is circulated a suitable refrigerating agent, the effect of the solutions circulating in the two coils 17, 18 being to cool the air which circulates through tank 16, thus reducing the air to the required low temperature before the cold air is permitted to flow into the congealing chamber.

If desired, means may be provided for depriving the air of a certain percentage of moisture before returning the air to the congealing chamber. To this end, a dehydrator 19 of suitable construction is positioned intermediate the exhaust fan and the upper part of the tower, said dehydrator being so constructed as to bring the air drawn from the top of the tower into contact with the cold surfaces of the dehydrator, for the purpose of condensing upon said cold surfaces some of the moisture present in the cold air.

Below the tower and in communication therewith is a column or stand pipe 20, the upper part of which is adapted to form a mold or compression chamber 21. Within the stand pipe below the compression chamber operates a platen 22 of a suitable compress, the latter being preferably in the form of a hydraulic press, the piston of which is indicated at 23. 24 designates a pressure head which is adapted to be placed in position between the mold or compression chamber 21 and the cooling chamber 7, in order that this pressure head 24 may coöperate with the platen 22 when compressing the artificially frozen particles of water into a cake of ice. The ice cake is adapted to be discharged from one side of the stand pipe through a suitable opening 25, the latter being normally closed in the operation of the apparatus by a suitable door or gate valve, and positioned opposite to this opening is a movable member 26, the latter being shiftable at the proper time into the path of the cake of ice, for the purpose of deflecting the ice cake through opening 25 and discharging said ice cake from the stand pipe.

The mode of procedure is as follows:— The exhauster 10 is set into operation; the cooling agents are caused to circulate through the coils 17, 18 and through the dehydrator, and water is supplied to sprayer 14. The air blown by the fan is cooled to the required temperature at or below the freezing point by circulating through tank 16, the air being supplied to the distributing chamber 11 and flowing uniformly into the lower part of congealing chamber 6. The air at the required temperature and under suitable pressure flows upwardly through chamber 6 and is returned by pipe 9 to the exhauster. The air is thus used repeatedly, and when the dehydrator 19 is employed the excess moisture is condensed from the air before the cool air is returned to the congealing chamber by the operation of the exhauster. The water falls by gravity through the cooling chamber, the falling drops of water meeting the upwardly flowing current of cool air, thereby resulting in freezing the particles of water as they fall through the tower. The water is frozen rapidly and economically so as to result in artificially frozen hail, the latter accumulating within chamber 7 at the base of the tower. At the proper time pressure head 24 is thrust across the stand pipe between chambers 7 and 21. Deflector 26 being in position in alinement with the stand pipe, and opening 25 being closed, the next step of the mode of procedure is to compress a certain quantity of the artificially frozen hail. The latter is supplied by chamber 7 to the mold or compression chamber by the operation of withdrawing pressure head 24 until the compression chamber has received the desired quantity of the artificially frozen hail. The pressure head having been placed in position again, the hydraulic press is operated for the purpose of operating platen 22, whereby the artificially frozen hail within chamber 26 is subjected to compression for the purpose of solidifying the hail into a cake of ice. A certain quantity of water may be supplied to the mold or compression chamber, and the temperature of this mold or compression chamber may be kept below freezing point, so that when the artificially frozen hail is compressed under powerful pressure into a cake of ice the water will also be subjected to pressure and be exposed to the low temperature of the mold or compression chamber, whereby there results a solid cake of ice. The door or gate valve is now adjusted to open the opening 25 and deflector 26 is moved into a position across the stand pipe. The platen 22 is raised by the action of the hydraulic press in a manner to bring the cake of compressed ice into contact with the deflector 26, the latter offering resistance to the upward movement of the cake of ice and forcing it through opening 25, thereby discharging or ejecting the ice from the stand pipe. The platen 22 is lowered, opening 25 is closed, ejector 26 returned to normal position and pressure head 24 is moved across the space between the chambers 7, 21, to restore the compression means into position to receive another charge of material from the tower, but during these operations of the compressing mechanism, cold air is supplied to the tower and the water is sprayed within the air so as to carry on the freezing of the water continuously.

While I described my invention as adapted for freezing water when sprayed into a counter current of air, it will be manifest that the process may be used for freezing liquids other than water. It will be noted that the liquid material to be frozen is in a finely divided condition by spraying it directly into a long column of cold air, and that the drops or particles of liquid material are individually enveloped by the air at a freezing temperature as such drops fall through the chamber of the tower. The liquid material being sprayed into the air at the top part of the tower, it is manifest that such liquid falls from such a height or travels for such a distance through the freezing atmosphere as to secure congelation of the liquid drops and result in hard icy granules or pellets. These are collected subsequent to the freezing of the liquid material within the chamber at the bottom of the tower, below the point at which the air is supplied thereto. The process enables ice to be produced rapidly and economically for the reason that the liquid material being discharged in a finely divided or sprayed condition directly into the long upwardly moving current of cold air is quickly converted into ice granules or pellets, the separate drops being enveloped by the air as they fall through the freezing atmosphere and the freezing of the drops being effected while suspended in the air. This results in an almost instantaneous conversion of the liquid material into the ice, in which respect the process is more rapid than other processes in some of which the freezing operation is carried on with a mass or layer of ice interposed between the refrigerating agent and the liquid to be frozen. A further advantage is that the resulting ice is sanitary and substantially free from impurities. Furthermore, the air is circulated and returned to the tower in order to utilize the air repeatedly and to attain economy of operation. When the apparatus is first started, the blower is set into action to exhaust air from the top of the tower and to blow it into the bottom thereof, the air circulating into contact with the refrigerating coils. This operation is continued for a length of time sufficient to lower the temperature of the air to a freezing point and to become cold. The temperature of the air may be 32° Fahrenheit, but it is, preferably, at or about 22° Fahrenheit, or at a temperature below those named. Now, by the operation of the blower the air is circulated into contact with the freezing coils and through the tower, the operation being continuous, as a result of which the cold air is used repeatedly. The air from the tower is in a relatively cold condition, and circulates into contact with the coils, so that the heat present in the air will be taken up by the contact of the air with such coils.

Having thus fully described the invention, what I claim as new, and desire to secure by Letters Patent is:—

1. In the art of producing ice cakes, the process which consists in circulating a current of air upwardly through a chamber, the temperature of the air being at or below the freezing point, discharging water into the upwardly flowing current of air, whereby the water is congealed as it falls by gravity through the current of cold air, collecting and drawing off from said chamber a predetermined quantity of the frozen particles, and then subjecting said quantity of frozen particles to pressure, thereby resulting in a solid cake of ice.

2. In the art of producing ice cakes, the process which consists in circulating in an upward direction and through a chamber a current of air the temperature of which is substantially at or below the freezing point, spraying water into the upwardly flowing current of cold air whereby the water so sprayed is frozen into small individual particles, and then subjecting certain quantities of the frozen particles to compression for solidifying the same into ice cakes.

3. In the art of refrigeration, the process which consists in passing water in a finely divided form downwardly through an upwardly moving long column of cold air, whereby the particles of water are congealed while suspended in the air and produce icy pellets or granules.

4. In the art of refrigeration, the process which consists in circulating a long column of gaseous fluid at a freezing temperature and in an upward direction through a treating chamber, and spraying the material to be frozen in a finely divided condition downwardly into said long column of gaseous fluid, said divided material passing through the gaseous fluid for such a distance as to result in the congelation of the material into icy pellets or granules, and subsequently forming into a mass the icy pellets or granules.

5. In the art of refrigeration, the process which consists in circulating a long column of cold air through a treating chamber, discharging water in a finely divided condition downwardly into such long column of cold air so as to result in icy pellets or granules while suspended in the cold air, conducting the air flowing out of the treating chamber into contact with cold surfaces, returning the cold air back to the treating chamber, and collecting the icy pellets or granules in a chamber separate from the treating chamber.

In testimony whereof I have signed my name to this specification in the presence of two subscribing witnesses.

WILLIAM S. OSBORNE.

Witnesses:
 H. T. BERNHARD,
 JAS. H. GRIFFIN.